US012585243B2

(12) United States Patent
Behandish et al.

(10) Patent No.: US 12,585,243 B2
(45) Date of Patent: Mar. 24, 2026

(54) MODIFYING ADDITIVELY MANUFACTURED PART DESIGNS USING TOPOLOGICAL ANALYSES

(71) Applicant: Genesse Valley Innovations, LLC, Santa Clara, CA (US)

(72) Inventors: Morad Behandish, Mountain View, CA (US); Saigopal Nelaturi, Mountain View, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 959 days.

(21) Appl. No.: 17/736,871

(22) Filed: May 4, 2022

(65) Prior Publication Data

US 2022/0269247 A1　Aug. 25, 2022

Related U.S. Application Data

(63) Continuation of application No. 16/235,229, filed on Dec. 28, 2018, now Pat. No. 11,353,847.

(51) Int. Cl.
G05B 19/4155　　(2006.01)
(52) U.S. Cl.
CPC .................... G05B 19/4155 (2013.01); *G05B 2219/35193* (2013.01)
(58) Field of Classification Search
CPC ...... G05B 19/4155; G05B 2219/35193; G06F 2113/10; G06F 30/20; G06F 30/17
See application file for complete search history.

(56) References Cited

U.S. PATENT DOCUMENTS

| | | | |
|---|---|---|---|
| 6,259,962 B1* | 7/2001 | Gothait | B33Y 40/00 |
| | | | 700/118 |
| 9,747,394 B2 | 8/2017 | Nelaturi et al. | |
| 9,946,816 B2 | 4/2018 | Kim et al. | |
| 10,061,870 B2 | 8/2018 | Nelaturi et al. | |
| 10,543,673 B2 | 1/2020 | Tran et al. | |
| 2015/0269282 A1* | 9/2015 | Nelaturi | B33Y 50/02 |
| | | | 700/98 |
| 2018/0264751 A1 | 9/2018 | Tran | |
| 2020/0055252 A1* | 2/2020 | Lewicki | G06F 30/20 |

FOREIGN PATENT DOCUMENTS

| | | |
|---|---|---|
| EP | 2926982 | 10/2015 |
| EP | 2922029 | 12/2015 |
| WO | 00/52624 | 9/2000 |

OTHER PUBLICATIONS

Nelaturi, Saigopal, and Vadim Shapiro. "Representation and analysis of additively manufactured parts." Computer-Aided Design 67 (2015): 13-23. (Year: 2015).*

(Continued)

*Primary Examiner* — Eunhee Kim
(74) *Attorney, Agent, or Firm* — Mueting Raasch Group

(57)　　　ABSTRACT

Set differences between an as-designed and an as-manufactured model are computed. Topological deviations between the as-designed model and the as-manufactured model are determined based under-deposition and over-deposition features of the set differences. Based on the discrepancies, an input to a manufacturing instrument is changed to reduce topological differences between the as-manufactured model and the as-designed model.

16 Claims, 15 Drawing Sheets

(56) References Cited

OTHER PUBLICATIONS

Pokorny, Florian T., Majd Hawasly, and Subramanian Ramamoorthy. "Topological trajectory classification with filtrations of simplicial complexes and persistent homology." The International Journal of Robotics Research 35.1-3 (2016): 204-223. (Year: 2016).*

Behandish et al., "Automated process planning for hybrid manufacturing", Computer-Aided Design, vol. 102, Sep. 2018, pp. 115-127.

Behandish et al., "Characterizing Topological Discrepancies in Additive Manufacturing", Proceedings for the 28th Fall Workshop on Computational Geometry, Oct. 26, 2018.

Behandish et al., U.S. Appl. No. 15/858,677, filed Dec. 28, 2017.

Berretti et al., "3D Mesh decomposition using Reeb graphs", Image and Vision Computing, vol. 27, Issue 10, Sep. 2, 2009, pp. 1540-1554.

Dai et al., "Support-Free Volume Printing by Mulit-Axis Motion", ACM Transactions on Graphics, vol. 37, No. 4, Article 1, Aug. 2018, 13 pages.

Edelsbrunner et al., "Persistent homology-a survey." Contemporary Mathematics, 2008;453:257-282.

Edelsbrunner et al., "Topological Persistence and Simplification", Proceedings 41st Annual Symposium on Foundations of Computer Science, Nov. 12-14, 2000, 13 pages.

Edelsbrunner, "Persistent Homology: Theory and Practice" Apr. 21, 2014, 19 pages.

European Search Report from EP Application No. 19219911.5 dated Oct. 7, 2020, 24 pages.

Goodman et al., "Surveys on Discrete and Computational Geometry: Twenty Years Later", Contemporary Mathematics, 2008.

Ilies et al., "On Shaping With Motion", J. Mech. Des. 122 (4), Feb. 1, 1999, 23 pages.

Kavraki, "Computation of configuration-space obstacles using the Fast Fourier Transform", IEEE Transactions on Robotics and Automation, vol. 11, No. 3, Jul. 1995, pp. 408-413.

Klahn et al., "Design for additive manufacturing-supporting the substitution of components in series products," Procedia Cirp, 2014;21:138-143.

Lozano-Perez, "Spatial Planning: A Configuration Space Approach", IEEE Transactions on Computers, vol. C-32, No. 2, Feb. 1983, pp. 108-120.

Lysenko et al., "Group morphology with convolution algebras", Proceedings of the 14th ACM Symposium on Solid and Physical Modeling, Sep. 1-3, 2010, pp. 11-22.

Nelaturi et al., "Manufacturability Feedback and Model Correction for Additive Manufacturing", Journal of Manufacturing Science and Engineering, vol. 137, No. 2, Apr. 1, 2015, pp. 21015-1.

Nelaturi et al., "Representation and Analysis of Additively Manufactured Parts", Computer Aided Design, vol. 67, Apr. 16, 2015, pp. 13-23.

Nelaturi et al., "Solving inverse configuration space problems by adaptive sampling", Computer-Aided Design, vol. 45, Issue 2, Feb. 2013, pp. 373-382.

Nelaturi et al., U.S. Appl. No. 15/858,520, filed Dec. 28, 2017.

Ranjan et al., "Integration of design for manufacturing methods with topology optimization in additive manufacturing," J of Manufacturing Sci and Eng, 2017;139.6.

Serra, "Image Analysis and Mathematical Morphology", Academic Press, Inc., 1983.

Wang et al., "Geometric decomposition of 3D surface meshes using Morse theory and region growing", The International Journal of Advanced Manufacturing Technology, vol. 56, Issue 9-12, Oct. 2011, pp. 1091-1103.

Wikipedia, "Betti number", retrieved from the internet, Oct. 6, 2018, 1 page.

Wikipedia, "Vietoris-Rips complex", retrieved Dec. 12, 2018, 4 pages.

Yamazaki, "Development of a Hybrid Multi-tasking Machine Tool: Integration of Additive Manufacturing Technology with CNC Machining", Science Direct, vol. 42, 2016, pp. 81-86.

Zhou et al., "Generalized Cylinder Decomposition", ACM Transactions on Graphics (TOG), vol. 34, Issue 6, Nov. 2015.

Zomorodian et al., "Computing Persistent Homology", Discrete Comput Geom, 33:249, 2005, pp. 249-274.

* cited by examiner

OD INTERIOR

────── OD FULL BOUNDARY

▬▬▬▬▬ OD CUT BOUNDARY

-------- UD FULL BOUNDARY

UD INTERIOR

────── UD FULL BOUNDARY

▬▬▬▬▬ UD CUT BOUNDARY

-------- OD FULL BOUNDARY

R = 12.0 pixels

R = 42.6 pixels

R = 73.1 pixels

R = 96.5 pixels

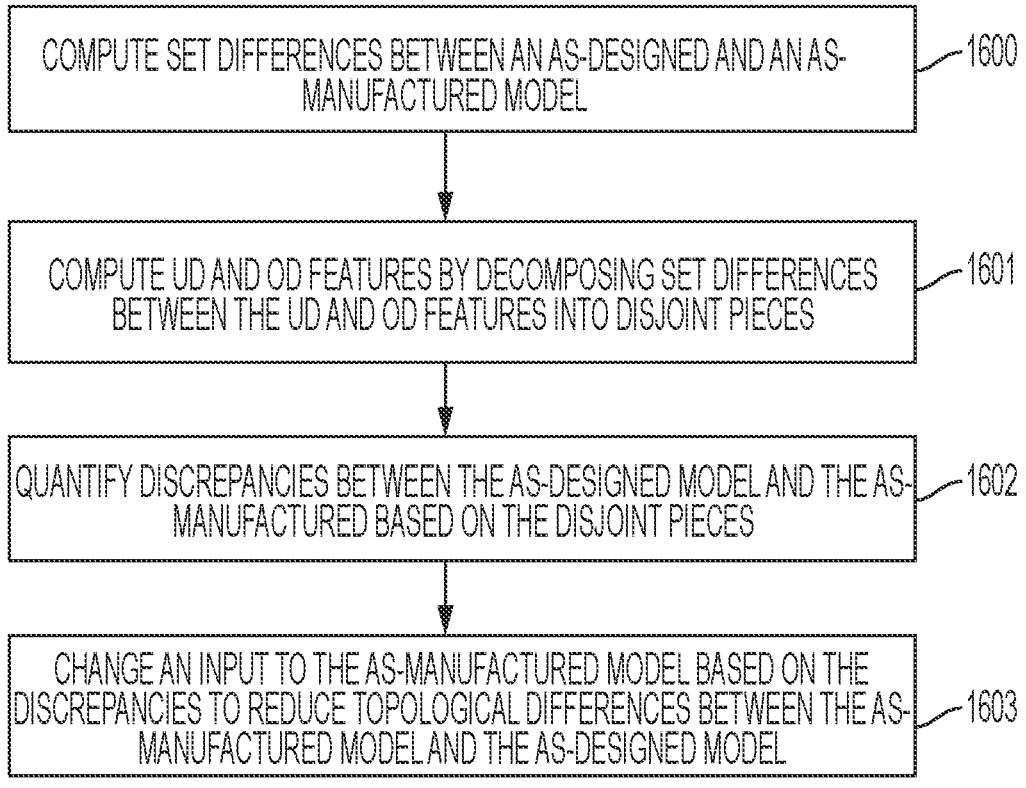

COMPUTE SET DIFFERENCES BETWEEN AN AS-DESIGNED AND AN AS-MANUFACTURED MODEL — 1600

COMPUTE UD AND OD FEATURES BY DECOMPOSING SET DIFFERENCES BETWEEN THE UD AND OD FEATURES INTO DISJOINT PIECES — 1601

QUANTIFY DISCREPANCIES BETWEEN THE AS-DESIGNED MODEL AND THE AS-MANUFACTURED BASED ON THE DISJOINT PIECES — 1602

CHANGE AN INPUT TO THE AS-MANUFACTURED MODEL BASED ON THE DISCREPANCIES TO REDUCE TOPOLOGICAL DIFFERENCES BETWEEN THE AS-MANUFACTURED MODEL AND THE AS-DESIGNED MODEL — 1603

FIG. 16

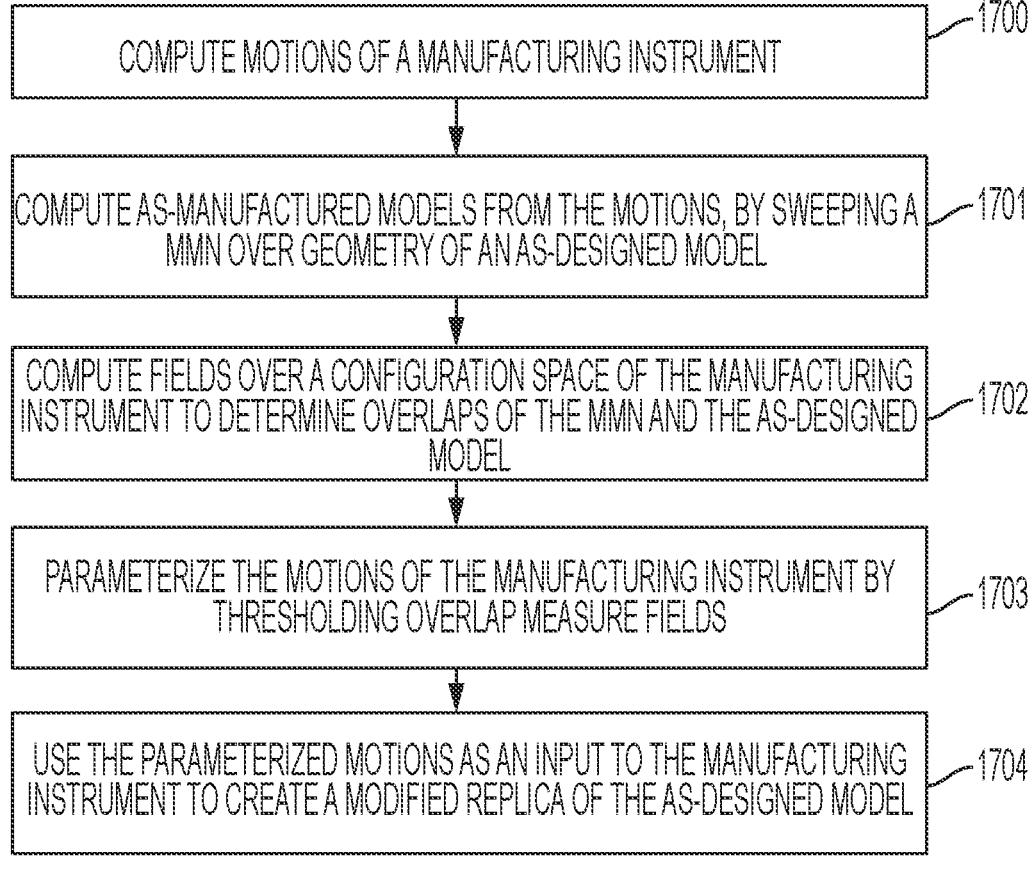

COMPUTE MOTIONS OF A MANUFACTURING INSTRUMENT ⎯1700

COMPUTE AS-MANUFACTURED MODELS FROM THE MOTIONS, BY SWEEPING A MMN OVER GEOMETRY OF AN AS-DESIGNED MODEL ⎯1701

COMPUTE FIELDS OVER A CONFIGURATION SPACE OF THE MANUFACTURING INSTRUMENT TO DETERMINE OVERLAPS OF THE MMN AND THE AS-DESIGNED MODEL ⎯1702

PARAMETERIZE THE MOTIONS OF THE MANUFACTURING INSTRUMENT BY THRESHOLDING OVERLAP MEASURE FIELDS ⎯1703

USE THE PARAMETERIZED MOTIONS AS AN INPUT TO THE MANUFACTURING INSTRUMENT TO CREATE A MODIFIED REPLICA OF THE AS-DESIGNED MODEL ⎯1704

FIG. 17

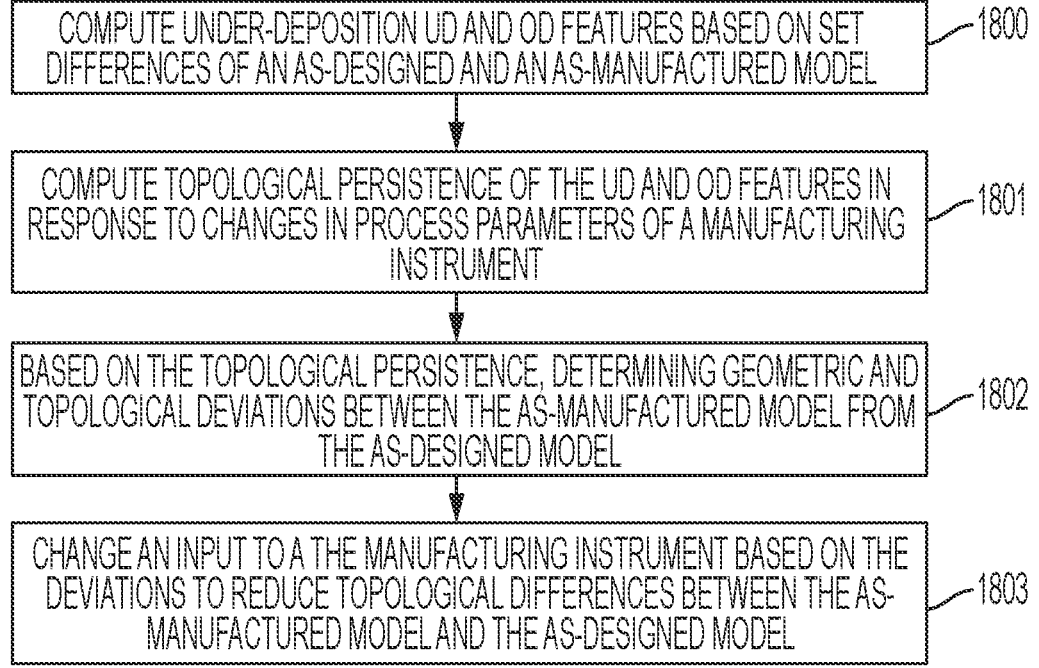

COMPUTE UNDER-DEPOSITION UD AND OD FEATURES BASED ON SET DIFFERENCES OF AN AS-DESIGNED AND AN AS-MANUFACTURED MODEL ⟋1800

COMPUTE TOPOLOGICAL PERSISTENCE OF THE UD AND OD FEATURES IN RESPONSE TO CHANGES IN PROCESS PARAMETERS OF A MANUFACTURING INSTRUMENT ⟋1801

BASED ON THE TOPOLOGICAL PERSISTENCE, DETERMINING GEOMETRIC AND TOPOLOGICAL DEVIATIONS BETWEEN THE AS-MANUFACTURED MODEL FROM THE AS-DESIGNED MODEL ⟋1802

CHANGE AN INPUT TO A THE MANUFACTURING INSTRUMENT BASED ON THE DEVIATIONS TO REDUCE TOPOLOGICAL DIFFERENCES BETWEEN THE AS-MANUFACTURED MODEL AND THE AS-DESIGNED MODEL ⟋1803

FIG. 18

MODIFYING ADDITIVELY MANUFACTURED PART DESIGNS USING TOPOLOGICAL ANALYSES

RELATED PATENT DOCUMENTS

This application is a continuation of U.S. application Ser. No. 16/235,229, filed on Dec. 28, 2018, now issued as U.S. Pat. No. 11,353,847, which is incorporated herein by reference in its entirety.

STATEMENT REGARDING GOVERNMENT SUPPORT

This invention was made with government support under contract number HR0011-17-2-0015 awarded by DARPA. The government has certain rights in the invention.

SUMMARY

The present disclosure is directed to determining structural integrity of additively manufactured parts using topological analyses. In one embodiment, set differences between an as-designed and an as-manufactured model are computed. Discrepancies between the as-designed model and the as-manufactured are determined based under-deposition (UD) and over-deposition (OD) features of the set differences. Based on the discrepancies, an input to a manufacturing instrument is changed to reduce topological differences between the as-manufactured model and the as-designed model.

In another embodiment, motions of a manufacturing instrument are computed. As-manufactured models are computed from the motions by sweeping a minimum manufacturable neighborhood (MMN) over geometry of an as-designed model. Fields are computed over a configuration space (C-space) of the manufacturing instrument to determine overlaps of the MMN and the as-designed model. The motions of the manufacturing instrument are parameterized by thresholding overlap measure fields. The parameterized motions are used as an input to the manufacturing instrument to create a modified replica of the as-designed model.

In another embodiment, UD and OD features are computed based on set differences of an as-designed and an as-manufactured model. Topological persistence of the UD and OD features are computed in response to changes in process parameters of a manufacturing instrument. Based on the topological persistence, geometric and topological deviations between the as-manufactured model from the as-designed model are determined. An input to a manufacturing instrument is changed based on the deviations to reduce topological differences between the as-manufactured model and the as-designed model.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

FIGS. 16-18 are flowcharts of methods according to example embodiments.

DETAILED DESCRIPTION

Figure 1:
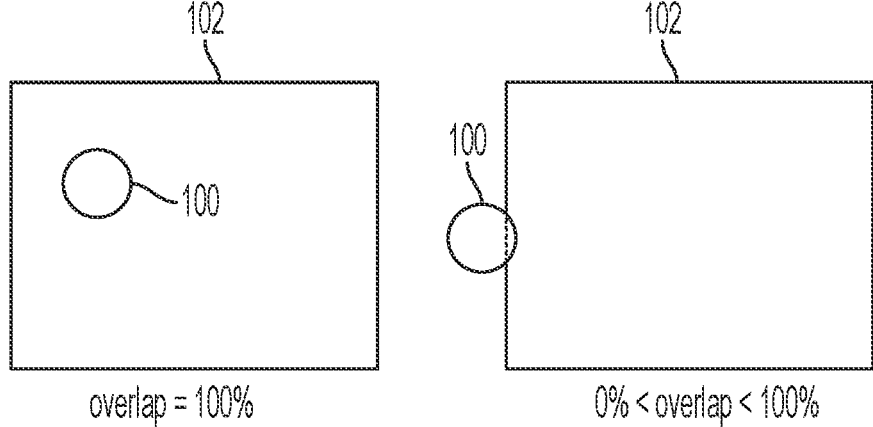
FIG. 1 is a diagram showing various levels of overlap in an additive process according to an example embodiment.

The present disclosure relates to additive manufacturing (AM). Additive manufacturing has lifted many of the limitations associated with traditional fabrication. Additive manufactured parts may include complex geometric and topological structures and multi-material microstructures to achieve improved performance such as high stiffness per weight, high surface area per volume for heat transfer, and so on. Notwithstanding, the as-manufactured structures will differ from the as-designed in ways that are difficult to characterize, quantify, and correct. These deviations will depend on machine and process parameters. Note that hereinbelow the term "printing" or "3D printing" may be used to describe particular additive manufacturing examples. However, this term is not intended to limit the embodiments to print-type processes only.

Previously, methods have been developed to identify, visualize, and correct non-manufacturable features in 3D printed parts. Although these methods provide visual and metrological information about the deviations from intended design, they do not offer insight on the topological aspects. For many AM structures (e.g., lattices and foams) the topological integrity of the structure can be important for the part to perform its functions. Even if the deviations are "small" from a metric point of view, they may lead to compromised function. For instance, if the beams in a lattice are slightly deformed due to the stair-stepping effect of layered manufacturing, it may not matter as much as its connectivity. Similarly, addition or removal of tunnels and cavities can impact performance (e.g., stress concentration under loads) or post-processing (e.g., powder removal in DMLS).

The present disclosure relates to methods and systems configured to characterize the structural integrity of AM parts and quantify the as-manufactured deviations from the as-designed in terms of topological properties. Quantifiers, such as Euler characteristic and Betti numbers, may be used to measure and certify such deviations. A family of as-manufactured variants (rather than a single model) is obtained over a range of custom AM parameters such as manufacturing resolution and over-deposition allowance. Topological data analysis can be used to identify topological deviations that persist across a relatively large range of parameters. These methods and systems can be used to provide a visual and computational design tool to the user to reveal trade-offs between process parameters, as well as a diagnostics tool for design optimization.

Practical limitations on the AM resolution and wall thickness introduce geometric and topological discrepancies between the as-designed target and as-manufactured model. For example, the layer thickness in direct metal laser sintering (DMLS) is in the range 0.3-0.5 millimeters along the layer (XY-plan) and 20-30 microns along the build direction (Z-axis) at the highest resolution, with a minimum hole diameter of 0.90-1.15 millimeters within a typical workspace of 250×250×325 millimeters-cubed. Attempting to fabricate designs that have smaller features may result in disconnected beams, filled holes/tunnels, or hard-to-predict combinations. The as-manufactured resolution and wall thickness of the 3D printer as shown in the part may eventually look and function quite differently from the as-designed part.

Methods may be used to model as-manufactured structures from a knowledge of as-designed shape and AM parameters such as manufacturing resolution and wall thickness. These methods may be used to generate AM primitives/actions in hybrid manufacturing processes, which involve additive combined and subtractive (e.g., machining) processes. The basic model of an as-manufactured shape is one that is obtained by sweeping a minimum manufacturable neighborhood (MMN) along an arbitrary motion that is allowed by the machine's degrees of freedom (DOF). Many AM instruments (such as 3D printers) operate by 3D translations of a moving part (e.g., printer head) over the workpiece as it deposits a blob of material that is modeled by the MMN (e.g., an ellipsoid or a cylindroid) whose radii/height are determined by the printer resolution along XYZ-directions. Unless the as-designed shape is not perfectly sweepable by the MMN along an allowable motion, the as-manufactured shape will differ. The motion need not be translational only (could be rotational, combination of rotations and translations, such as general rigid body motion, composition of multiple rigid body motions, etc.) The case of translations is merely an example, provided for purposes of illustration.

One challenge is to find the "best" motion of the head whose sweep of MMN results in a shape as close as possible to the as-designed target. The answer is not unique, as it depends on the notion of closeness. Closeness may be defined by criteria based on which the discrepancies are measured or quantified.

This disclosure describes an approach to define and compute as-manufactured shapes. At every point in the 3D space inside the printer workspace—which represents a translational motion of the printer head—one obtains the overlap measure between the stationary as-designed shape and a MMN instance translated to the said point as the volume of the intersection region between them. The block diagram in FIG. 1 shows an MMN 100 overlapping a design geometry 102 according to an example embodiment. On the left-hand side of FIG. 1, the MMN 100 completely overlaps the geometry 102, and on the right-hand side the MMN 100 partially overlaps the geometry. Generally, the overlap measure between the as-designed part can change from zero to the total volume of the MMN 100.

The measure of overlap can be thought of as a real-valued field defined over the configuration space (C-space) of relative motions (e.g., translational, rotational, or combined) between the workpiece and manufacturing instrument. For example, most commercial 3D printers operate with translational DOFs by printing flat layers on top of each other, in which case the overlap field can be viewed as a field over the printer workspace in 3D. In such cases, the printability analysis can be performed in at least two different ways. In a layer-by-layer analysis, the as-designed model is sliced along the build orientation into many layers that are a constant distance apart (e.g., equal to printer's known layer thickness). For each 2D as-designed slice, a 2D field of overlap measures is constructed by using a 2D model of the MMN (e.g., nozzle or laser beam cross-section). The measure is the surface area of intersections between 2D shapes. The printability analysis may also use a full 3D analysis. In this type of analysis, a 3D field of overlap measures is obtained between the 3D as-designed model and a 3D model of the MMN (e.g., a blob of material that is representative of a deposition unit). In this case, the layer thickness and build orientation are encoded into the shape of the MMN. The measure is the volume of intersections between 3D shapes.

The layer -by-layer analysis approximates the full 3D analysis when the layer thickness is much smaller than the characteristic size of the MMN cross-section (e.g., a thin disk) so that volumetric overlap can be approximated by the area overlap times the thickness. This is the case in many processes. For instance, there is one order of magnitude difference in XY- and Z-resolutions in DMLS. It has been shown that the overlap measure field can be computed cumulatively for all translational motions by a cross-correlation of indicator (e.g., characteristic) functions of the as-designed shape and MMN in 3D—or their slices/cross-sections in 2D.

The indicator function of a shape is a field in its underlying space that maps every point in that space to a binary value; namely, 0 if the point is outside and 1 if the point is inside the shape. It can be viewed as an implicit model of the shape that characterizes point membership queries about that shape. Cross-correlation is a standard operation on integrable fields that is computed as a convolution of the first field—indicator function of an as-designed shape—with a reflection of the second field—indicator function of the MMN. The convolution, in turn, can be computed rapidly using fast Fourier transforms (FFT) for which highly efficient parallel implementations exist on both CPU and GPU architectures.

In general, the AM instrument can move according to arbitrary DOF (e.g., both translational and rotational) in which case the overlap measure is defined over a higher-dimensional C-space. For example, in addition to 3D printing with flat layers, robotic 3D printers with higher-DOF have been prototyped—e.g., to enable support-free 3D printing on adaptively reoriented platforms. Moreover, "multitasking" machines for hybrid (combined additive and subtractive) manufacturing are becoming increasingly popular.

These machines use the computer numerically controlled (CNC) motion system—originally developed for high-axis machining—for AM as well, enabling deposition of material on non-flat surfaces (e.g., around a cylindrical shaft) using rotational or combined rotational and translational motions.

The methods described herein are not restricted to translational motions. For example, for arbitrary subgroups of the group of rigid motions (e.g., combined translations and rotations), the convolution formulation of the overlap measure generalizes to group-theoretic notion of convolutions. The FFT-based implementation is more complicated to reconcile. However, partial speed-ups can be obtained by using the unique properties of the rigid motion group—e.g., by computing a different overlap measure field for sparsely sampled orientations.

The different superlevel-sets of the cross-correlation (the overlap measure) field give a family of totally-ordered sets (ordered by set inclusion) of configurations in the C-space (relative translations and/or rotations). The members of the family can be distinguished by a single parameter; namely, the overlap measure that changes between zero and total measure of the MMN—or an overlap measure ratio between 0 and 1 after normalizing it by the maximum value that can be assumed constant for most AM processes. At every choice of the parameter (e.g., if one chooses a ratio of 35%), all configurations of the MMN that lead to at least that overlap measure ratio are included in the as-manufactured shape, e.g., all displacements of the MMN that make at least 35% of its volume overlapped by the as-designed part. For translational motion, the minimum and maximum superlevel sets corresponding to 0% and 100% overlap measure ratios are the morphological dilation and erosion and can be computed using Minkowski sum and difference. For higher-DOF motions with rotations, these notions generalize to the C-space obstacle and its complement (free space) and can be computed using Minkowski products and quotients as well as lifting and projection maps between Euclidean 3D space and configuration space.

Figure 2:
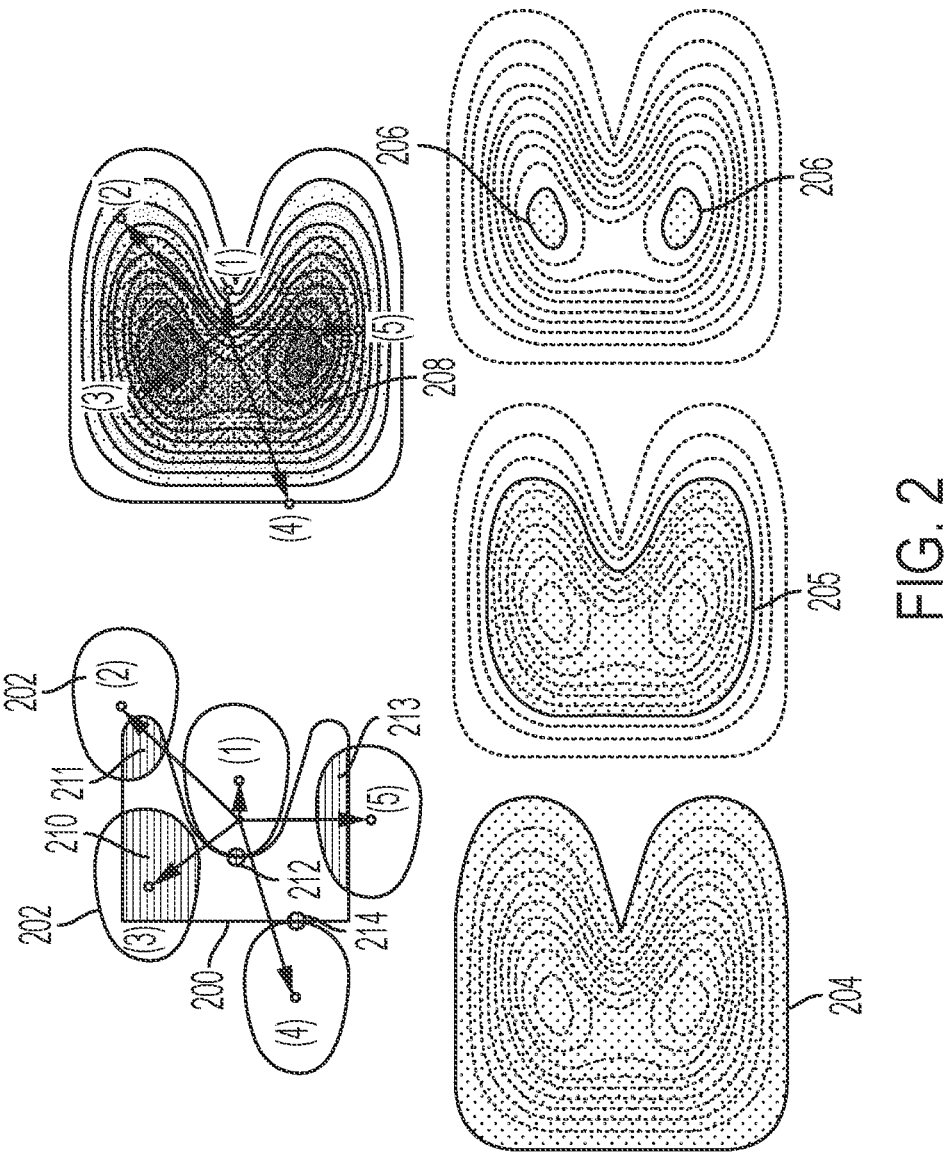
FIG. 2 is a diagram of a cross-correlation field for an as-designed shape and a minimum manufacturing neighborhood according to an example embodiment.

In FIG. 2, a diagram shows an example 2D cross-correlation field 208 for an as-designed shape 200 and a MMN 202 according to an example embodiment. The cross-correlation field gives the overlap measure—in this case the area of the intersection regions 210-214 shown for five configurations of the MMN 202. Different superlevel-sets of the cross-correlation field correspond to a family of configuration sets (e.g., motions)—in this case, 2D translations collected into the pointsets 204-206. Sweeping the MMN 202 along each of these motions leads to a one-parametric family of printable (e.g., MMN-sweepable) shapes that are morphologically close to the target as-designed shape 200.

For each one of these configuration sets 204-206, the as-manufactured shape is obtained by sweeping the MMN along the set, which is characterized as another dilation and can be computed as a Minkowski sum/product depending on the motion DOF. The one-parametric family of as-manufactured alternatives form a totally ordered set in the 3D space (in terms of set containment) bounded by the two extremes.

At a first extreme, the sweep of MMN along configurations with slightly under 100% overlap leads to a strict under-deposition/under-fill policy. In this case, the as-manufactured shape is the maximal depositable region (MDR)—with the specified DOF and MMN of the 3D printer—that is completely contained inside the as-designed part. This guarantees that all containment constraints for which the part was originally designed (e.g., remaining inside some envelope while moving in assembly) will remain satisfied in spite of as-manufactured deviations. In fact, the constraints are satisfied with minimal possible compromise in shape due to AM limitations.

At a second extreme, the sweep of MMN along configurations with slightly over 0% overlap leads to a strict over-deposition/over-fill policy. In this case, the as-manufactured shape fully contains the as-designed with an extra offset. This is useful as a global allowance to generate a near-net shape that fully contains the as-designed shape and can be later machined down to get closer to the as-designed shape.

There is a spectrum of possibilities for the as-manufactured shape when the allowance is relaxed by choosing a value of the overlap measure ratio between 0 and 1. Every decrease in the overlap measure ratio grows the as-manufactured shape by a non-uniform offset that depends on the local geometry of both the as-designed shape and MMN. For translational motions, the under-fill shape is a morphological opening (dilation of erosion) while the over-fill shape is a double-offset (dilation of dilation). The continuous family of as-manufactured shapes in between, parameterized by the overlap measure ratio, will have small geometric deviations from the as-designed part as the MMN gets smaller in radius. However, they can have dramatically different topological properties.

The changes in the machine DOF, MMN size/shape, and the criteria on overlap measures can introduce topological discrepancies to the as-manufactured shape(s) from the as-designed shape, regardless of how small the geometric deviations are. A method and system can be configured to characterize the differences in basic topological properties of an arbitrary as-designed shape and an as-manufactured shape—including but not necessarily restricted to as-manufactured models computed using the methods explained above.

One concept utilized in these systems and methods is the notion of Euler characteristic (EC) of the shapes, which compactly characterizes some of the main topological properties of any shape. For example, if the shape is discretized with a cellular complex, the EC is obtained as $EC=V-E+F$ where V, E, and F are the total number of vertices, edges, and faces in the complex, respectively. Another relationship that is useful for these purposes is $EC=B0-B1+B2$ where B0, B1, and B2 are the Betti numbers (BN) of the shape. In 3D, the BNs correspond to the number of connected components, tunnels (i.e., through-holes), and voids/cavities, respectively.

Figure 3:
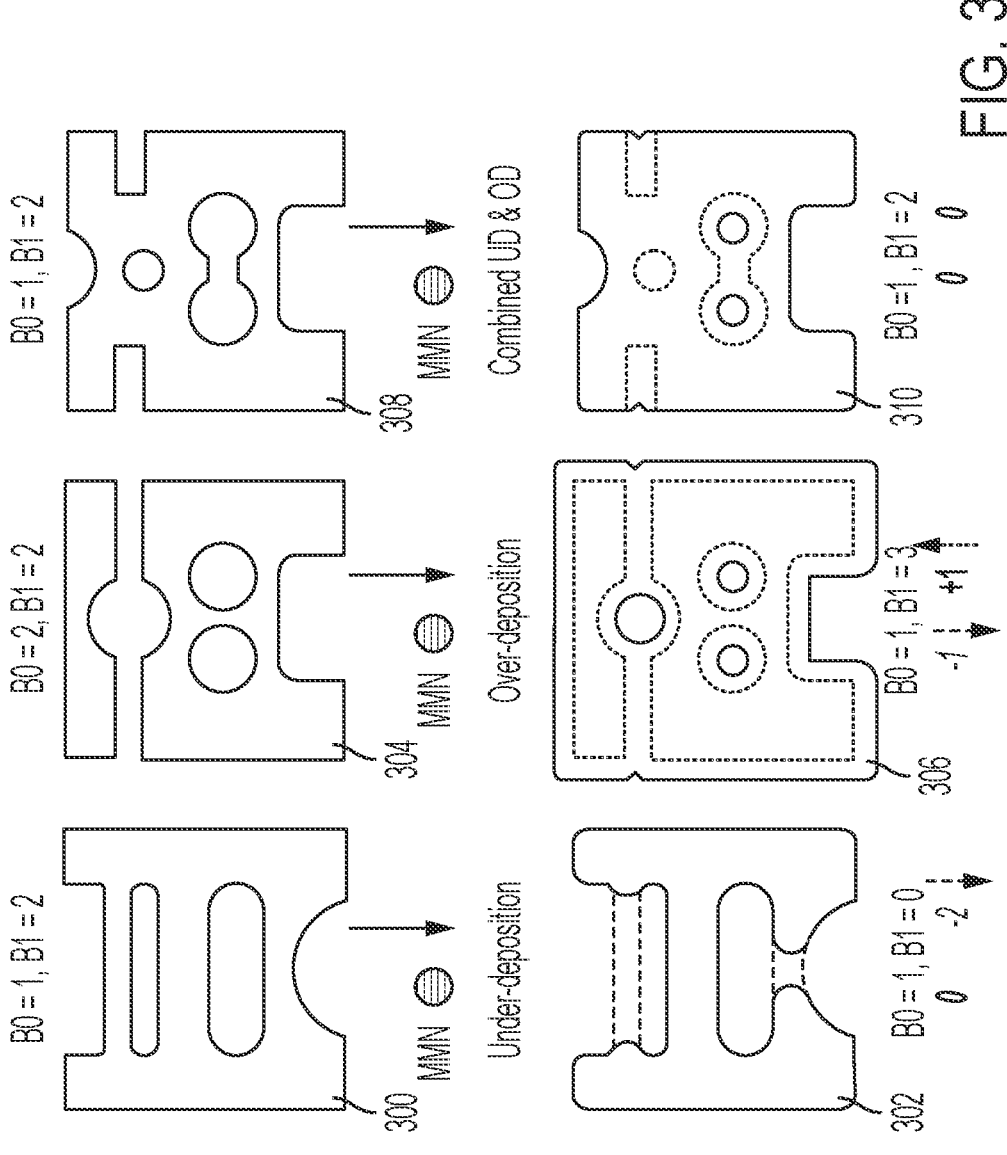
FIG. 3 is a diagram showing the effects of under and/or over deposition on shapes according to example embodiments.

In FIG. 3, a diagram shows differences in BNs between as-designed and as-manufactured shapes according to an example embodiment. The BNs (only B0 & B1 in 2D) are shown in FIG. 3 for a few simple 2D examples of as-designed vs. as-manufactured shapes with under- and over-deposition policies. The EC and BNs are global topological properties. Therefore, comparing them between the as-designed and as-manufactured shapes does not provide much information on local topological discrepancies and what features are responsible for them. For example, beams thinner than the MMN diameter could break when using an under-deposition policy. However, the structure may remain globally connected through other links across, as shown by respective as-designed and as-manufactured shapes 300, 302. In this example, under deposition may lead to broken beams but that may or may not affect total number of connected components (B0) or tunnels (B1), which correspond to holes for the 2D case. In this case two holes merge with the external empty space (B1 reduces by 2). The EC increases by 2 as a result.

Tunnels or cavities may be covered if they are smaller than the MMN diameter when using an over-deposition policy, but they may be part of a larger hole or tunnel that remains topologically intact. As seen by respective as-designed and as-manufactured shapes 304 and 306, over deposition may lead to covered holes but that may or may not affect total number of connected components (B0) or holes (B1). In this case two disconnected components join and a new hole appears, leading to a decrease in B0 and an increase in B1. The EC does not change as a result.

In more complicated scenarios, multiple holes can merge in strange ways while new holes appear, keeping the total number of holes the same. As seen by respective as-designed and as-manufactured shapes 308 and 310, it is possible in both under deposition or under deposition (or combined policies) to see no change in BNs, hence no change in EC either. In this case, a hole splits into two and another hole gets covered at the same time.

In general, the global EC and/or BNs may remain the same and counting their global changes is insufficient to detect local topological discrepancies. Even when they do change, their values provide no insight into what features might have caused those changes and how to fix them by either changing the design or the manufacturing process parameters (e.g., MMN size/shape). Methods described herein can provide a more detailed and localized account of topological discrepancies between the as-designed and as-manufactured shapes. The methods can provide a precise report on which features or their boundaries with the rest of the part caused which defect(s) and how they can be fixed by using a different policy that is specialized for that feature—e.g., over-deposition for thin beams and under-deposition for covered holes.

One of the useful properties of EC is its additivity. If a shape is decomposed into a union of several other (possibly intersecting) shapes, its EC can be computed by an alternating sum expressed as: sum of the ECs of all components, minus EC of pairwise intersections, plus EC of triplewise intersections, and so on. When two shapes are being compared—namely, the as-designed (D) and as-manufactured (M) shapes—the difference between their ECs is quantified in terms of ECs of the under-deposition (UD) and over-deposition (OD) regions and their boundaries with D and M. The global topological deviation as a function of the local topological properties of these regions can be expressed as in Equation (1) below.

$$EC[M]-EC[D]=(EC[\text{OD region}]-EC[\text{OD's cut boundary}])-(EC[\text{UD region}]-EC[\text{UD's cut boundary}]) \quad (1)$$

The OD is defined as the region in space that is obtained as the regularized set difference of D from M, which is roughly the set of 3D points that are inside M but outside D (the over-deposited material). This set sticks out of the original design and is connected to the rest of M along pieces of the boundary of D. These pieces are collectively called the OD's "cut boundary," an example of which is shown as dashed lines on shape 306 in FIG. 3.

The UD is defined as the region in space that is obtained as the regularized set difference of M from D, which is roughly the set of 3D points that are inside D but outside M (the under-deposited material). This set sticks inside the original design and is connected to the rest of M along pieces of the boundary of M. These pieces are collectively called the UD's "cut boundary," an example of which is shown as dashed lines on shape 302 in FIG. 3.

Figure 4:
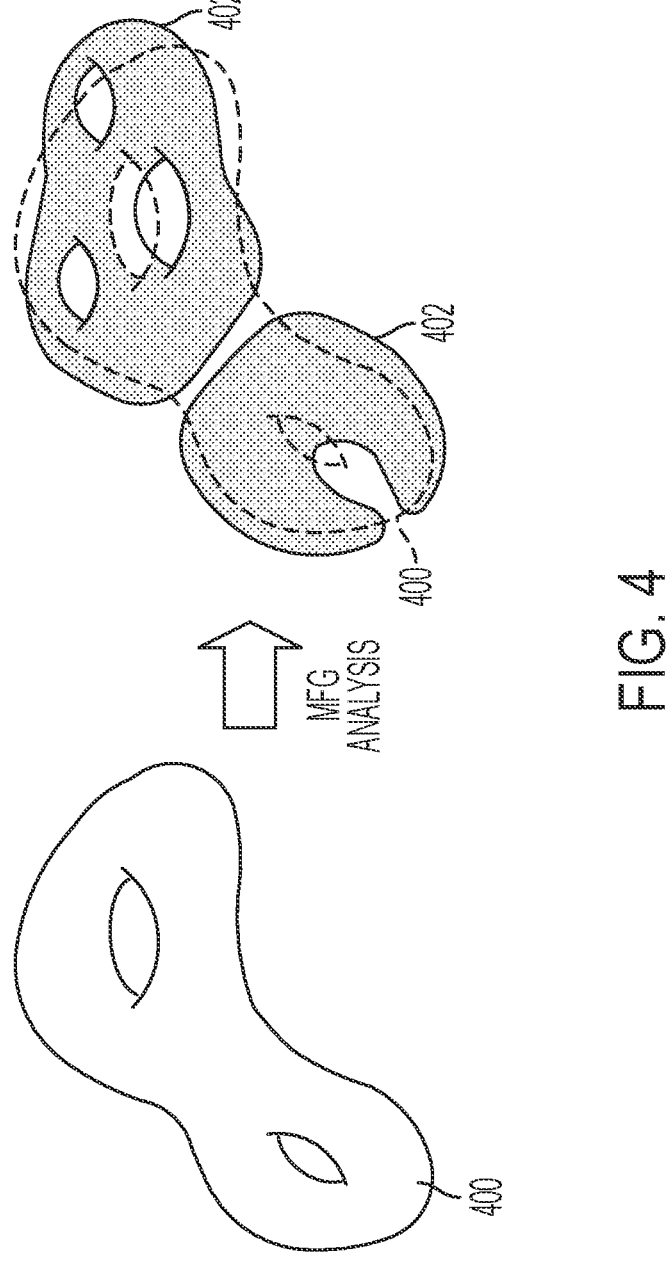
FIG. 4 is a diagram showing a comparison between as-designed and as-manufactured shapes according to an example embodiment.
Figures 5, 6:
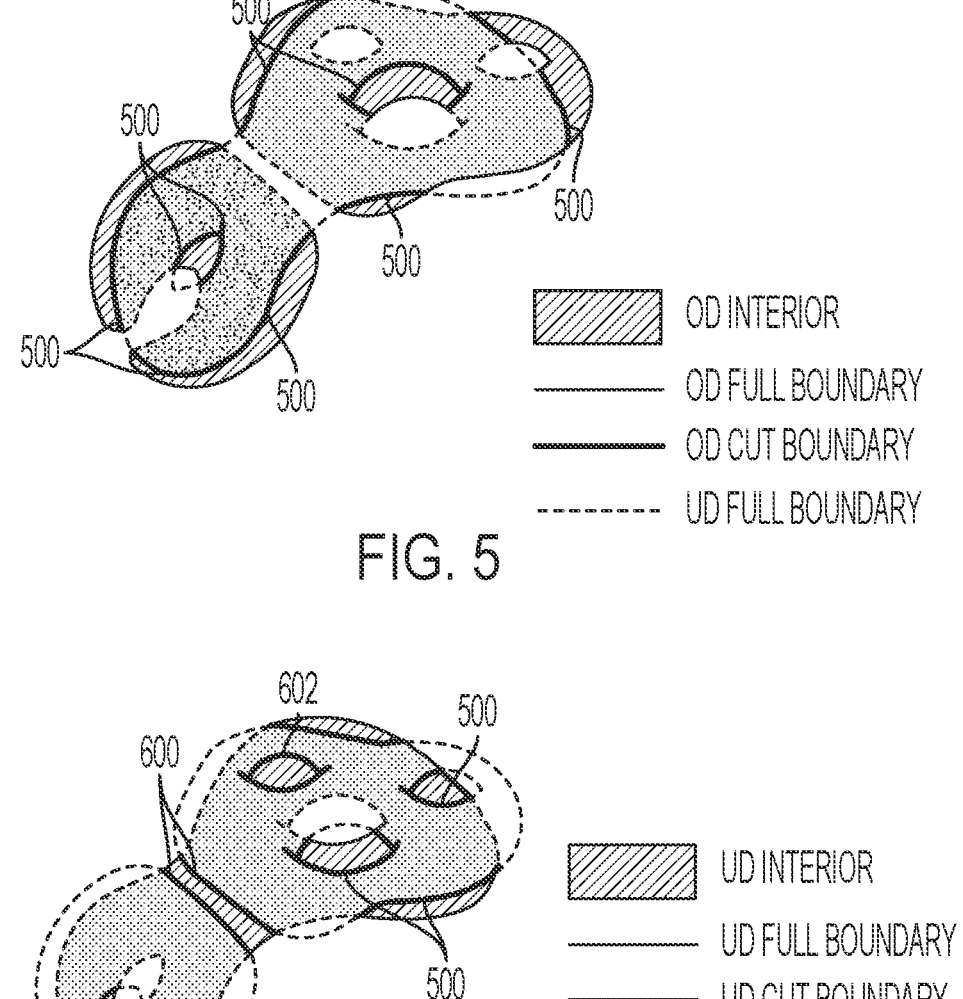
FIGS. 5 and 6 are diagrams showing under and over deposition regions according to example embodiments.

As seen in FIG. 4, an example is provided of arbitrary changes from the as-designed shape 400 to as-manufactured 402 according to an example embodiment. This can be modeled using any method of choice, not just thresholding overlap measures (e.g., values of cross-correlation fields). As seen in FIGS. 5 and 6, for arbitrary changes in the global topology of the shape, the deviations are identified in terms of contributions of local OD & UD features. Formula (1) above can be expanded further in terms of the ECs of the different connected components of each of OD and UD. Noting that the different connected components of any shape are (by definition) the disjoint connected shapes (shapes that do not intersect) whose union is the original shape (in this case the overall UD or OD under consideration), the EC of the shape can be expressed as the sum of ECs of connected components due to EC's additivity.

Consider the simpler case in which each of these connected components are homeomorphic to a ball, a volume having no tunnels or cavities. In that case EC=B0−B1+B2 reduces to EC=1 (since B1=0 and B2=0). Thus, the EC of the volumetric portion of the feature is equal to unity for each connected component of OD and UD. However, it may or may not be unity for the cut boundaries, which will determine whether that feature is contributing a nonzero value to the overall difference between the total number of connected components of as-designed and as-manufactured parts. Only if the cut boundary is a single simply-connected patch for a given volumetric component 500, the contribution of the feature (composed of the volumetric component paired with the cut boundary) will be zero to the overall EC. If the cut boundary is, for example, multiple simply-connected patches 600, or a hollow closed surface (topological sphere) 602, or multiply-connected complex surfaces, the contribution will be nonzero. In other words, the decomposition enables one to quantify the contribution of each local change to the total global change. Even if any of the global BNs is intact due to the kinds of nontrivial exchanges between local elements discussed earlier (e.g., as in shapes 308 and 310 in FIG. 3), the local changes themselves will be revealed and quantified. The local changes are quantified by analyzing the different connected components of the symmetric difference of D and M (the OD and UD pieces) and their cut boundaries. In a nutshell, the two terms in Equation (1) are expanded as shown in Equations (2) and (3) below, where CB stands for cut boundary.

$$(EC[\text{OD region}]-EC[\text{OD's CB}])=\text{sum of } (EC[\text{OD piece}]-EC[\text{OD piece's share of CB}]) \text{ for all OD pieces} \quad (2)$$

$$(EC[\text{UD region}]-EC[\text{UD's CB}])=\text{sum of } (EC[\text{UD piece}]-EC[\text{UD piece's share of CB}]) \text{ for all UD pieces} \quad (3)$$

Substituting the above identities into the earlier formula leads to the following conclusion: The total change in EC of the shape due to manufacturing imperfections can be obtained as the sum of total contributions of OD pieces minus the sum of total contributions of UD pieces. Each piece's contribution can be computed independently from the others, which enables the computation by perfectly parallel processing.

For the general case where each connected component is not simply connected and contractible (e.g., B1 and B2 are nonzero as well hence EC is not the same as B0), each connected component can be broken down into smaller pieces until each smaller piece has EC=1 for the volumetric interior and the negative contributions of the cut boundary are computed for each piece. However, the smaller pieces will not be disjoint, as they will share boundaries with each other, unlike the case with disjoint (bigger) connected components. In this case, one requires more terms in the above two formulae to add/subtract the EC of the shared boundaries in the form of an alternating sum. To solve this, each connected component of OD and UD is efficiently decomposed into simply connected pieces using various standard techniques. The boundaries between these pieces (pairwise, triplewise, and so on) can be obtained from the shape's Reebs graph, from which the additional terms in the above formulae are systematically included. The alternative approach is to use any standard method to compute all BNs per original OD and UD piece and their cut boundaries.

Once the contributions of different pieces to the overall EC is determined, the method reasons about the different modes of manufacturing failure due to local topological discrepancies. Moreover, it provides feedback on locally changing the deposition policy locally or the as-designed structure itself to alleviate the problems. Based on the type of difference regions between D and M (OD versus UD) and the sign and value of their contributions to BNs (e.g., adding/removing one or more connected components, tunnels, or cavities) different classes of topological defects and potential remedies are identified.

For example, if a UD feature contributes a positive amount to the total number of connected components (B0) and/or a negative amount to the total number of tunnels (B1), it suggests a broken beam (e.g., shape 302 in FIG. 3). One remedy is to apply an OD policy in the vicinity of that particular feature—e.g., using the cross-correlation methods explained earlier, but this time applying it locally to the UD feature rather than the entire design.

If an OD feature contributes a negative amount to the total number of connected components (B0) and/or a positive amount to the total number of tunnels (B1), it suggests a covered tunnel (see shape 306 in FIG. 3). One remedy is to apply a UD policy in the vicinity of that particular feature—e.g., using the cross-correlation methods explained earlier, but this time applying it locally to the OD feature rather than the entire design.

Even when none of the BNs change (in which case, neither does EC as a result), this method can still detect nonzero contributions of the different features to the total zero change. For example, it will reveal the case where a hole gets covered while two other holes get merged, leading to a net change of zero in B1 (see shape 310 in FIG. 3). This is because multiple OD and/or UD connected components will appear in the set difference between D and M and their precise role in the changes in BNs. In particular for this example, an increase in B1 due to one feature and a decrease in B1 due to another feature that cancels it out in the net sum are detected regardless of the net sum being zero. For the purpose of illustration, 2D examples are shown and described above, however the theory generalizes to 3D and the method works for both manufacturability analysis of 2D slices and the whole 3D shape alike. Note that the machine DOF do not affect the method's applicability as it works for arbitrarily complex D and M shapes.

The above analysis detects topological discrepancies between the as-designed and as-manufactured shapes and identifies their spatial distribution in terms of local contributions from UD and OD features. It also provides useful information to make local changes to the design or MMN to eliminate those contributions. However, this analysis cannot detect how important each of these contributions are relative to one another. It considers a single as-manufactured outcome; hence provides little insight on how persistent they are across the spectrum of all possible as-manufactured alternatives that one can obtain by changing the AM process specs or deposition policies—e.g., by changing the shape/size of MMN, threshold on overlap measure ratio, etc. If one considers changes in a one -parametric family of as-manufactured shapes as a continuous evolution along a time-like axis, a temporal analysis can be used in addition to the spatial analysis given in previous section to provide insight into the level of impact that local changes can have on the as-manufactured shape.

Persistent homology is a powerful computational tool for topological data analysis, first introduced for continuous topological simplification through one-parametric filtration of a growing cell complex. The present method can use persistent homology to capture persistent topological features of as-manufactured shapes as they are varied across the different parameters such as MMN size or overlap measure ratio. Given a number of data points in an arbitrary-dimensional metric space, one can think of a number of growing balls centered at each point (of the same radius) which characterize an influence region around the point with respect to the chosen metric.

Figures 7, 8:
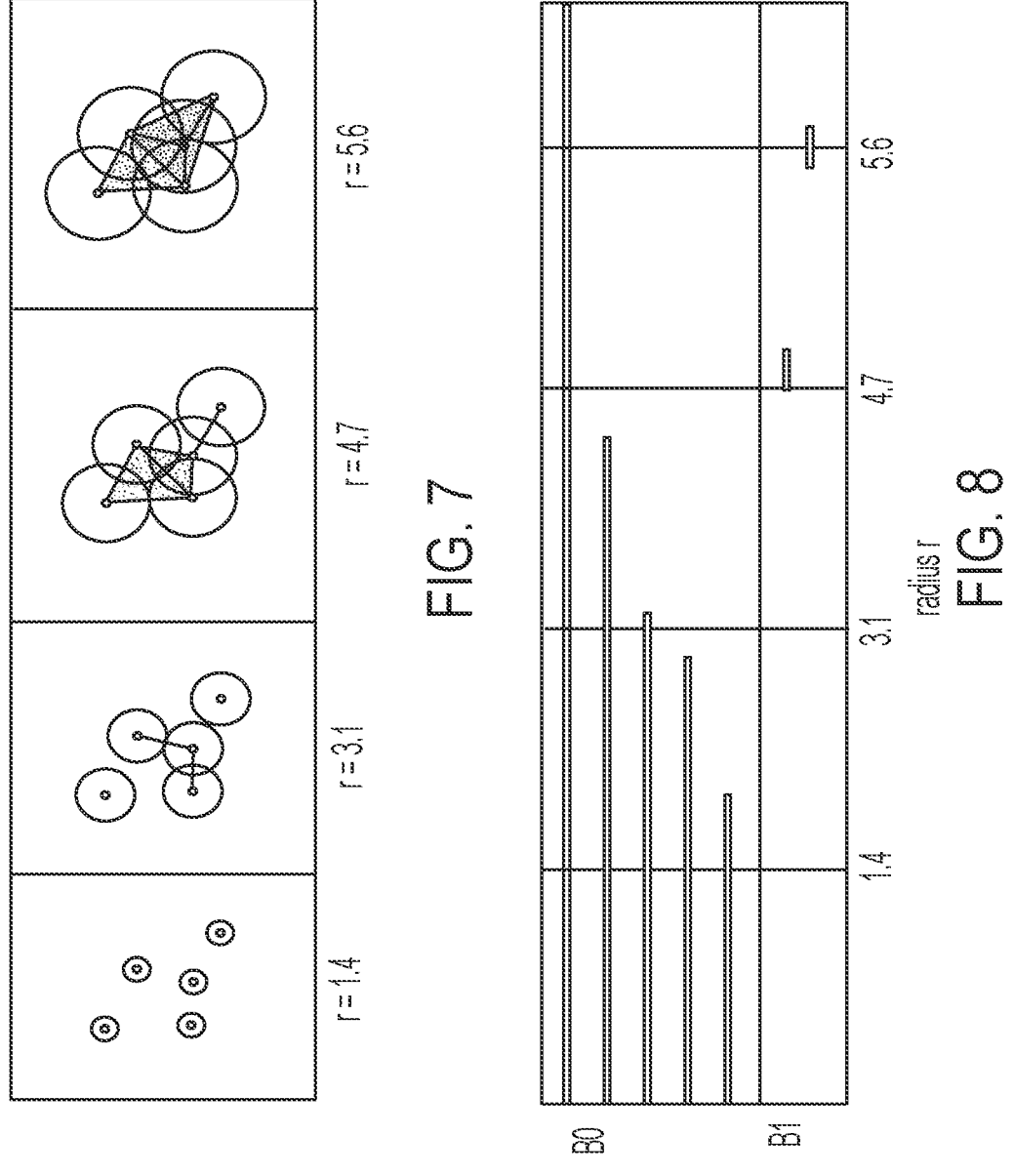
FIG. 7 is a diagram illustrating a growing cell complex using in persistent homology analysis according to an example embodiment.
FIG. 8 is a persistence barcode chart showing persistence of features shown in FIG. 7.

An example of how growing feature size affects topology is seen in FIG. 7. As the radius r is increased, the balls grow and start intersecting each other increasingly more. One can think of an abstract simplicial complex—called the Vietoris-Rips (or simply Rips) complex—that characterizes these intersections. For example, if two balls intersect, a 1-cell (an edge) is drawn that connects the vertices assigned to their centers. Hence if three balls intersect pairwise but not triplewise, one sees an empty triangle between them. If they also intersect triplewise, a 2-cell (filled triangle) can be drawn between them. This process is called topological "filtration" and the growing radius is sometimes called the proximity/filtration parameter.

As the shape of the union of balls and its representative Rips complex evolve, its topological properties change. A topological "event" is described as the birth/death of a topological feature such as a merging two connected components into one, filling of a hole/tunnel or cavity, and so on. If the filtration is thought of as an evolution over time, the BNs can be plotted over time as well as bars that indicate the time interval between birth and death of features (one bar per (birth, death) pair of events). The so-obtained "persistence barcode" is often divided into pieces, one for each homology group corresponding to BNs. An example of a persistence barcode is shown in FIG. 8, which plots the birth/death of components (B0) and holes (B1) in FIG. 7 as the radius increases.

Figures 9, 10:
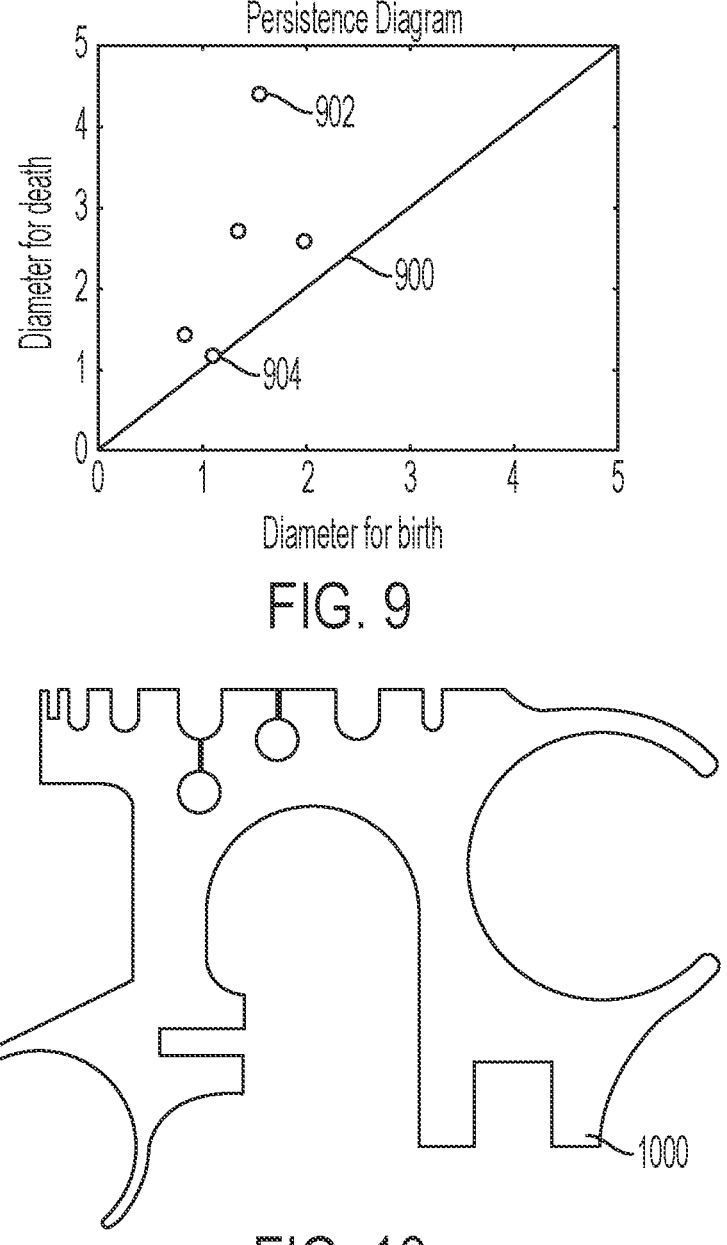
FIG. 9 is a persistence diagram showing topological events according to an example embodiment.
FIG. 10 is diagram of a part used to illustrate analysis methods according to an example embodiment.

The persistence barcode is a topological signature of the data with regards to its distribution in the metric space. A "persistence diagram" can also be used to visualize the results in which the birth and death times are plotted against each other in a 2D plot, an example of which is shown in FIG. 9. The farther from the intercept line 900 the (birth, death) point is, the more distant in time those events are, and the more persistent (hence fundamental) that feature is perceived to be. Thus point 902 in FIG. 9 is associated with the feature that has the longest persistence. The fundamental topological features of data are those which persist over longer periods of filtration. On the other hand, features that are not persistent (e.g., point 904) can be due to noise/errors in computation, and are less likely to be of significance. The length of bars in persistence barcode can similarly provide an indication of the fundamental features.

Persistent homology has since been applied to various different types of cell complexes and filtration methods. For example, a superlevel-set of a function can be viewed as a filtration based on which a cubic cell complex that represents a voxelization of the set can be studied for its evolving topological properties/events.

As applied to AM, this technique may be applied using two different filtrations. First, for a fixed deposition policy (e.g., constant overlap measure ratio in our own cross-correlation method), a filtration is provided by changing the size of the MMN. This can be done by applying uniform scaling on a fixed-shape MMN, but any other shape parameterization that corresponds to a realistic family of growing MMNs for one or more 3D printers can be used. Second, for a fixed MMN shape/size (e.g., fixed 3D printer with fixed specs), a filtration is provided by changing the deposition policy. This can be done by using the overlap measure ratio (between 0 and 1) as the filtration parameter, but any other filtering that produces a total ordering can be used.

There are more recent methods developed for persistent homology of multi-variate filtrations which can be applied to analyze the simultaneous changes in both MMN shape/size and deposition policy. The following discussion will focus on a single-parametric filtration that changes one parameter while keeping the other fixed, starting from MMN size. This method will be illustrated on 2D as-designed slices and as-manufactured slices obtained as superlevel-sets of the 2D cross-correlation field obtained using a 2D cross-section of a thin-disk MMN. However, the exact same approach can be applied to the full 3D analysis.

In FIG. 10, a diagram shows an example shape 1000 used to demonstrate persistent homology methods according to example embodiments. The shape has relatively complex geometry but a simple topology for illustration purposes (homeomorphic to a disk; EC=B0–B1=1). The method applies to arbitrary topology but this example shape 1000 is chosen to simplify the illustration and not for limitation. The shape 1000 has several interesting geometric features such as sharp corners and thin flanks. Although it appears to have holes, they are not topological holes because they are connected to external space through a thin channel. This results in a simply-connected shape with BNs B0=1 & B1=0.

Figure 11:
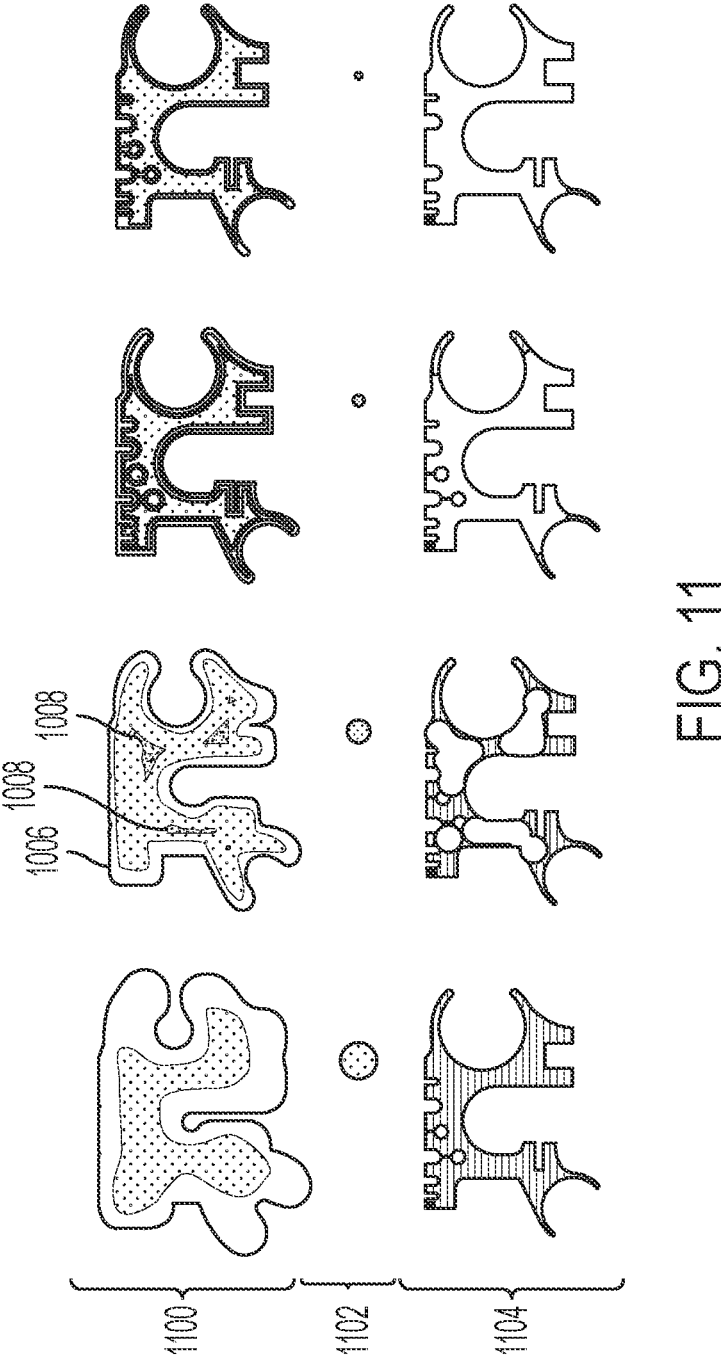
FIG. 11 is a diagram showing cross-correlation fields and the resulting under-deposition as-manufactured shapes for various additive manufacturing resolutions according to an example embodiment.

Using a strict under-deposition policy with a simple disk-shaped MMN with varying radius, a family of as-manufactured slices are computed as the morphological openings of the as-designed slice with each disk. This leads to "filleting" the corners of the as-designed slice that are sharper than the MMN radius and eliminating the features that are thinner than the MMN diameters. An example applied to the shape 1000 from FIG. 10 is shown in FIG. 11. The overlap measure (cross-correlation) fields 1100 are shown for different, disk-shaped MMNs 1100. The min/max level-sets are also shown as curves, e.g., curves 1006, 1008 respectively. The max superlevel-sets 1008 represent the maximal set of translational configurations of the MMN that are fully contained inside the as-designed slice (strict under-deposition). Sweeping the MMN along this set gives the white areas in shapes 1104, whereas the hatched regions are non-manufacturable.

For the smallest MMN (effectively a point) the non-manufacturable region is empty (not shown) and the as-manufactured shape is identical to the as-designed shape. As the radius is increased from this ideal case, the as-manufactured shape shrinks (from right to left) until it completely disappears when the MMN diameter is larger than the thickest feature in the as designed shape (left). Along this evolution, topological features are born or die, and are captured by this method.

The larger the MMN radius that is picked, the smaller the as-manufactured slice will be as it is constrained by the chosen policy to be completely contained inside the as-designed slice. Moreover, the family of one-parametric filleted slices are totally ordered by set containment meaning that every increase in fillet radius leads to a slice that is fully contained inside an earlier slice with a smaller fillet radius. This is true for arbitrary shapes of MMN (provable by set-theoretic arguments), if the MMN increases in size in a way that it contains an earlier MMN, the resulting morphological opening is contained inside the one obtained with the earlier MMN.

As the as-manufactured shape gets smaller and starts deviating from the as-designed due to imposed disconnections that happen along thin features within which the MMN does not fit anymore. At certain "critical" values of the MMN size (disk radius/diameter in this example) topological events occur such as the birth of two or more connected components from one, death of two or more holes by merging into one, etc. The methods described herein provide a detailed account of these events by performing persistent homology.

Whenever such a totally ordered family is given, one can assemble them into a field by arithmetic summation of their indicator functions. Each superlevel-set of this field corresponds to one as-manufactured shape, hence the persistent topological features can be identified by applying persistent homology to this field using a superlevel-set filtration. The field can be represented discretely on a uniform grid of pixels (2D image) or voxels (3D image) and calling a standard persistent homology code written for cubic cell complexes. This is the simplest and arguably most efficient/general implementation since cross-correlations and morphological operations are extremely fast on image representations using FFT-based convolutions as explained above. If a different discretization of the fields is preferred for any particular use-case, the analysis can be done on the corresponding cell complex in a similar fashion.

Figure 12:
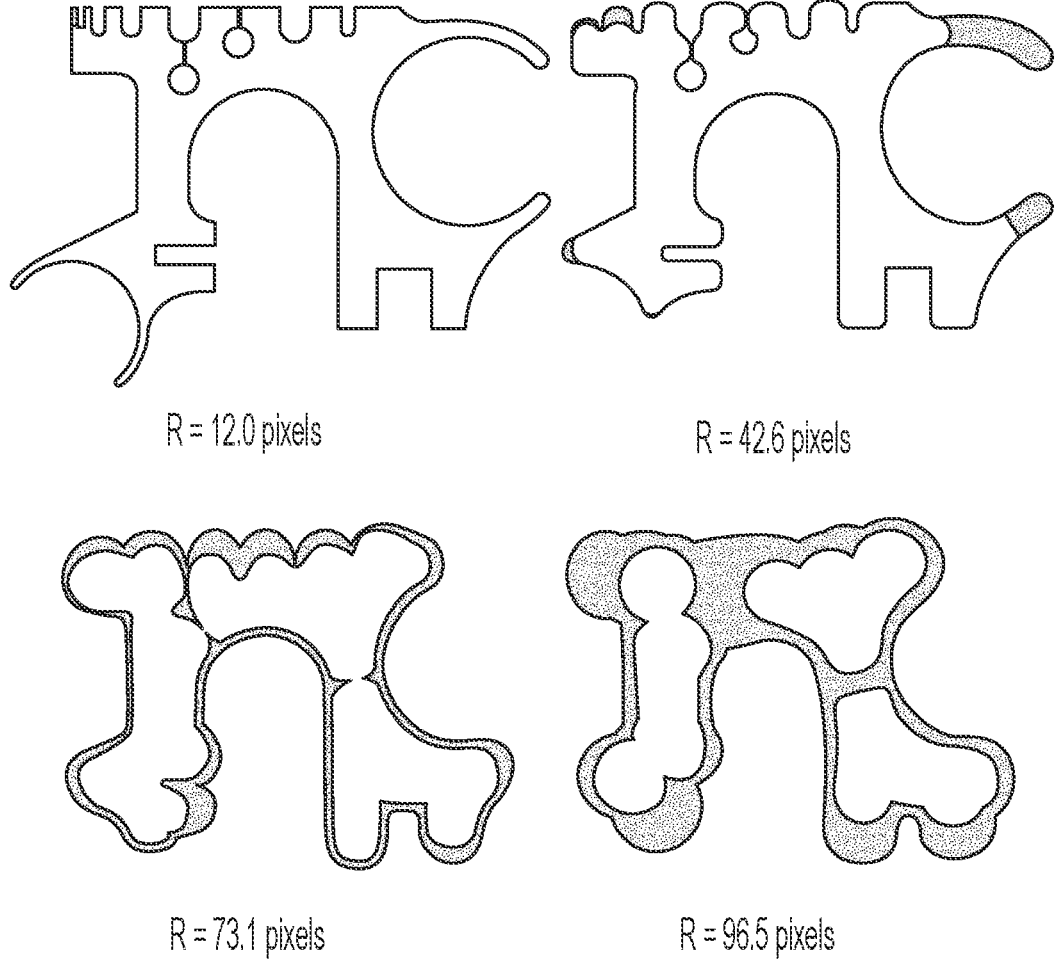
FIG. 12 is a diagram of fields obtained as a summation of indicator functions of as-manufactured shapes according to an example embodiment.

Now consider the second filtration (based on overlap measure ratio). For a fixed MMN, the cross-correlation readily provides a field, computed using a single FFT-based convolution. Superlevel-sets of this field are extracted for different overlap measures. For each set, the as-manufactured slice is obtained as a sweep (dilation) with the MMN. The indicator functions of the resulting family of shapes are once again summed up to obtain the field on which the same persistent homology algorithm can be applied using a super-level-set filtration as seen in FIG. 12. The only thing that changes from the previous procedure is the input field. Each field in FIG. 12 represents a totally ordered family of as-manufactured slices for the as-designed slice 1000 in FIG. 10 using a constant radius of the MMN (e.g., fixed AM process resolution, measured in image pixels) but a range of overlap measure ratios (between 70% and 100% in this example). Darker points correspond to higher overlap measure ratios. The darkest black regions indicate strict-under deposition, and the brightest grey indicates a 30% allowance for over-deposition.

If the analysis is performed for filtration based on one parameter (e.g., overlap measure ratio) while keeping the other one fixed (e.g., MMN size) and the algorithm is repeated for different values of the latter, a number of persistence barcodes/diagrams are obtained that provide a detailed account of expected topological behavior for a range of different AM processes with varied resolution and allowance specs.

To simplify the visualization of the enormous amount of information, first consider the global topological properties of the as-manufactured shape and how it evolves with different combinations of the two independent parameters. One of the BNs can be plotted (for example, the number of connected components B0) as a function of the two parameters placed on the two axis of a 2D plot. An example of this is shown in FIG. 13.

Figure 13:
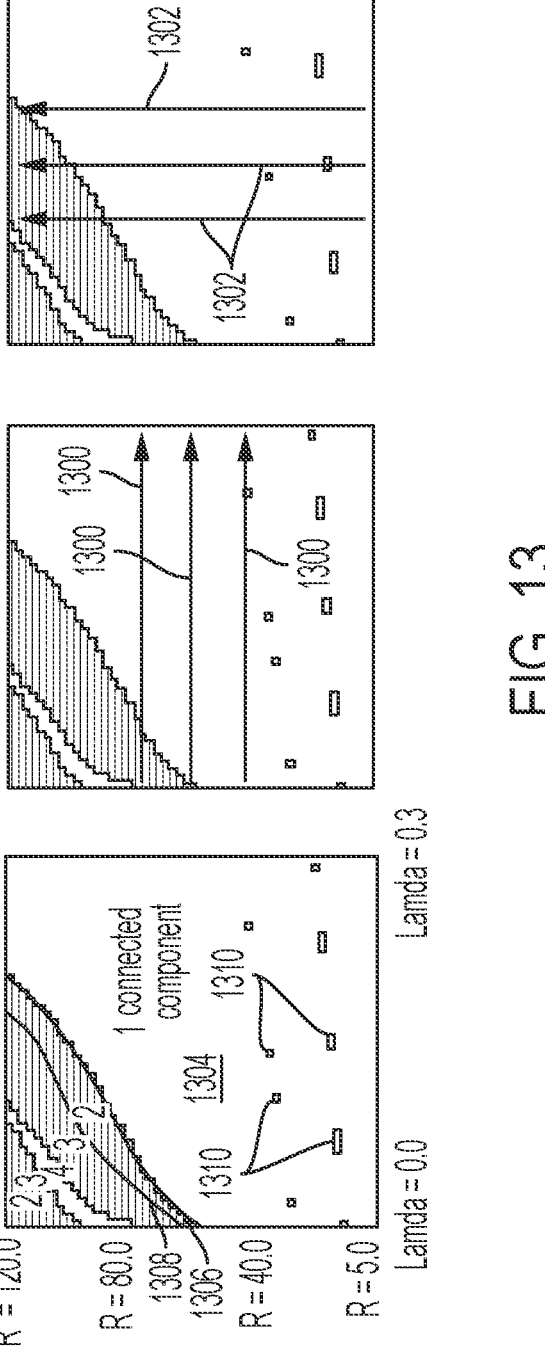
FIG. 13 is a plot visualizing the effects of two independent parameters on topology according to an example embodiment.

In FIG. 13, plots show the number of connected components (B0) for the as-manufactured slices plotted (left) using different allowance (abscissa) and MMN radii (ordinate) for the example as-designed slice 1000 in FIG. 10 (B0=1). On the two plots on the right, each horizontal line 1300 and vertical line 1302 represents trade-offs between geometric and topological losses. For a fixed resolution, the intersection of the horizontal line 1300 corresponding to fixed MMN radius with the boundary of the large region 1304 in the plot gives the minimum required allowance for the printed slice to keep its as-designed connectivity properties (B0).

For a fixed allowance, the intersection of the horizontal line 1304 corresponding to fixed overlap measure ratio with the boundary of the region 1304 in the plot gives the minimum required resolution for the printed slice to keep its as-designed connectivity properties (B0). The intersection of these lines with the other regions each indicate the "critical" values of the printing parameters at which some as-designed topological property (in this case, connectivity) is about to be compromised.

This plot provides a useful visualization of the trade-offs that are inevitable when using AM to approximately build a given as-designed shape. For example, using a low-resolution 3D printer (larger MMN) will inevitably result in geometric deviations from the as-designed shape. Increasing the allowance for over -deposition (smaller overlap measure ratio threshold) could further introduce geometric deviations that one may or may not be able to remove later—e.g., using machining. However, the plot shows that the connectivity can be recovered by adding the allowance if one can tolerate the additional geometric inaccuracies. In other words, when topological integrity is more important—which is often the case, e.g., in infill lattices that have to remain connected for structural strength or porous for heat convection—our method provides a tool to analyze how much sacrifice is needed in geometric accuracy to maintain topological properties. This is illustrated by the horizontal lines 1300 in FIG. 13.

If there are strict restrictions on the geometric accuracy—e.g., due to containment constraints in assembly or limited accessibility for machining the near-net shape—the allowance has to remain small. The plot shows what it takes in terms of minimum AM process resolution if the connectivity is to remain intact. In other words, it reveals the minimum MMN size for a given maximum allowance for which the topological integrity can be preserved. This is illustrated by the horizontal lines 1300 in FIG. 13.

Note that each of the boundaries between different shaded regions in FIG. 13 can be viewed as a Pareto frontier. They reveal the trade-offs between resolution (MMN size) and allowance (overlap measure ratio) for a tolerable limit/bound on the deviation of a topological property (e.g., some BN). For example, the first curve 1306 is the Pareto front for zero tolerance on the difference in the BN of connected components between as-designed and as-manufactured shapes. The second curve 1308 is a Pareto front for the case in which the most that can be tolerated is to change the BN by 1, which will add/remove one connected component, tunnel, or cavity, depending on which BN is plotted. For every fixed front, the plot gives the designer visual feedback on what the options are with respect to AM process resolution and allowance, so he/she can choose what to do depending on what is available on the manufacturing shop floor, tolerance specs, etc.

Another important information revealed by the plot is the singularities (e.g., regions 1310) that represent the (resolution, allowance) combinations that should be avoided. These combinations lead to unstable computational results in modeling the topological properties of the as-manufactured shape. If the computations are reasonable approximations to the reality of AM—which is the assumption for everything else to make sense—then this means that the actual output of the AM process may be unpredictable in these cases.

Figure 14:
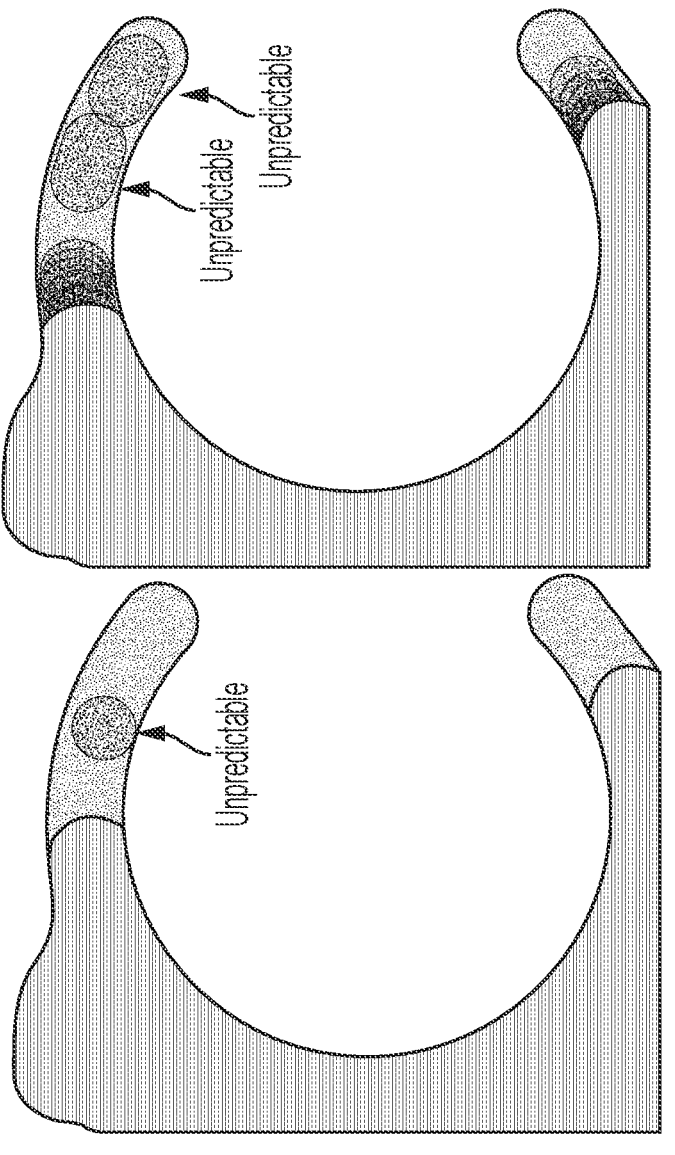
FIG. 14 is a diagram of field summations showing regions of unpredictability indicated in FIG. 13.

For example, as shown in the example fields shown in FIG. 14, when the MMN diameter is very close to the thickness of a noncircular feature, the overlap measure cannot be reliably computed especially due to rasterization errors. If the AM instrument (e.g., a digital 3D printer) also follows these computational algorithms to determine its motion along each slice, e.g., the set of motions identified as superlevel-sets of cross-correlation, the physical outcome will be unpredictable as well.

Similar 2D plots can be generated for other BNs or EC to provide feedback to the designer about the variations of global topological properties with respect to AM parameters and the inherent trade-offs between geometric accuracy and topological integrity. The same analysis can be performed on the contributions of local features to the global variations as discussed in an earlier section. The latter is not only favorable due to focusing attention on the precise spatial locations of potential topological defects, it is computationally more practical because local features can be represented by smaller cubic complexes and the persistent homology algorithm terminates in a much shorter period of time. Hence this method can provide real-time feedback to the designer as they vary the parameters and see its effects on the BN plots for each potentially problematic feature. The designer can accordingly make corrections locally or globally and try again.

Figure 15:
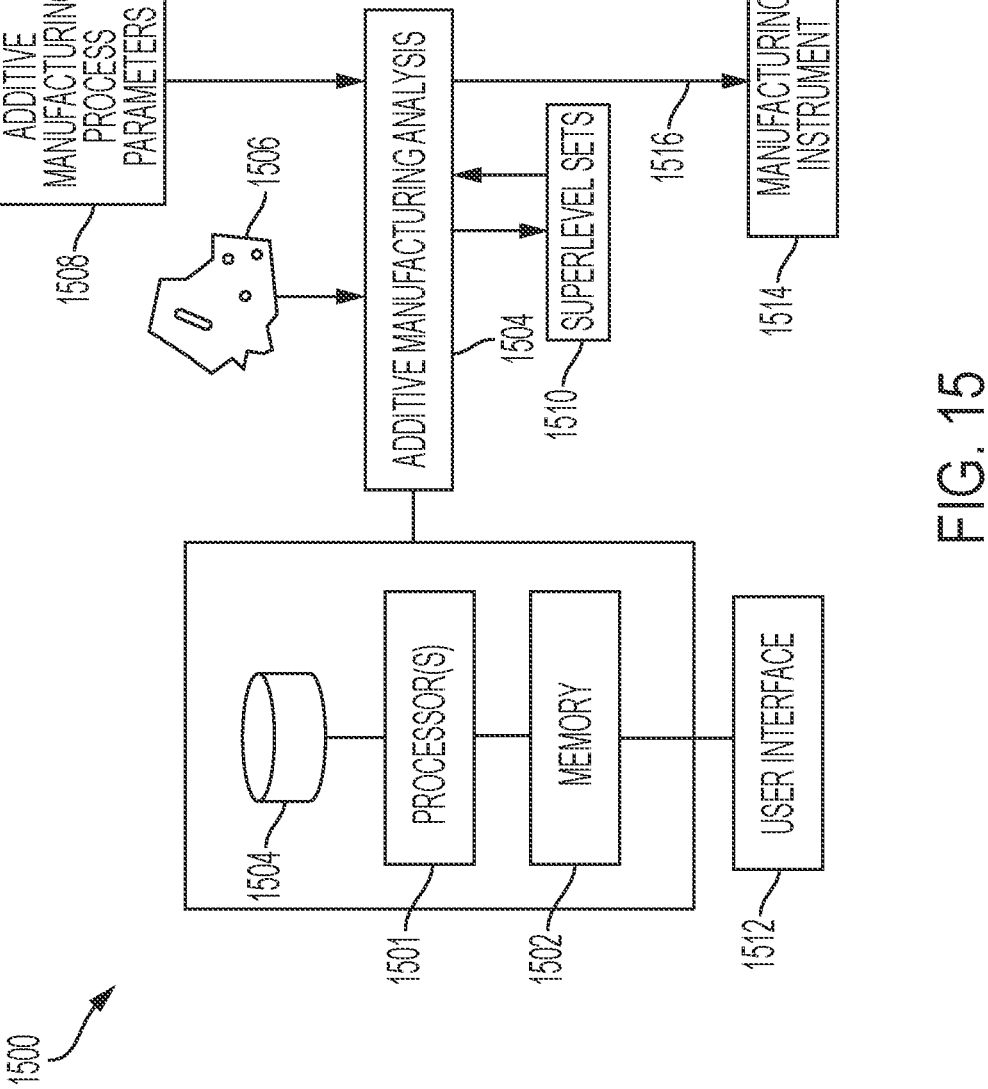
FIG. 15 is a block diagram of a system according to an example embodiment.

In summary, the present disclosure describes methods and systems used to quantify and qualify structural integrity of additively manufactured parts by the aid of a digital computer. An example system utilizing these methods is shown in FIG. 15. The system 1500 includes one or more processors 1501, memory 1502 (e.g., random access memory) and persistent storage 1504 (e.g., disk drive, flash memory). These components 1501, 1502, 1504 are coupled by data transfer lines (e.g., memory busses, input/output busses) and are configured to perform functions indicated by functional module 1506. The processor 1501 may include any combination of central processing units and graphical processing units.

The module 1504 receives input data (e.g., CAD geometry) that describes an as-designed shape 1506 of arbitrary complexity. The module 1504 also utilizes parameters 1508 that may describe an arbitrary representation and specifications of an AM process in terms of its MMN and deposition policy (e.g., allowance for over-deposition). Based on this data, 1506, 1508, the module 1504 obtains the indicator functions of the input representations of the as-designed target 1506 and MMN, which is a 3D field that assigns a binary number to every point in the 3D space (1/0 for points that are inside/outside the shape, respectively). A convenient 3D field representation is given by voxelization—akin to images with binary pixels but in 3D—but any other field representation can be used. Or a 3D volume can be decomposed into 2D and processed as described above.

The following analysis can be performed either on full 3D model or on its 2D slices for a specific build orientation and slicing parameters (e.g., layer thickness). If the latter is chosen by the user or deemed suitable by the algorithm, the indicator functions of the slices of as-designed shape and MMN slice are obtained from the indicator functions of their 3D models. The cross-correlations of the two indicator functions are computed, which is a convolution of the first indicator function (as-designed shape or one of its slices) with the reflection of the second indicator function (MMN or its cross-section). This produces a real-valued field in 3D space that can be interpreted as the overlap measure of the MMN with the as-designed shape (the total volume/area of their intersection in 3D/2D) if the MMN is moved to different positions in the 3D/2D space that contains the as-designed shape/slice.

Next, desired superlevel-set(s) 1510 of the obtained overlap measure (cross-correlation) field corresponding to the desired deposition policy is obtained. This can range from strict under-deposition—where the as-manufactured shape/slice is required to be fully contained inside the as-designed shape/slice—to conservative over-deposition where the as-designed shape/slice is thickened everywhere. They correspond to the max/min superlevel-sets of the cross-correlation field. There are a family of mixed under- and over-deposition possibilities in between these two extremes that are obtained as superlevel-sets parameterized by partial overlap measure ratios. Each set represents a potential candidate for as-manufactured shape/slice that is close to the as-designed shape/slice but has both geometric and (possibly) topological deviations from it due to AM limitations.

The output 1510 from this part of the software can be used as input to the next steps described below. However, the rest of the algorithm works for arbitrary as-manufactured shapes/slices. Hence, if the user chooses to call an external module to use different algorithms based on different criteria to generate the as-manufactured shape/slice (or a family of them) they can do so, import the result, and the rest of the method will work without any changes.

Given the as-designed shape/slice and one possible as-manufactured shape/slice that is computed in any arbitrary way, the global and local topological discrepancies can be quantified between the shapes/slices as well as the contribution of different features to the deviations and possible remedies to recover the lost topological properties. For example, the following can be computed: the OD and UD regions (the difference regions between the as-designed and as-manufactured shapes/slices); the intersection region between the as-designed and as-manufactured, and boundaries that the intersection regions share with the as-designed and as-manufactured shapes/slices. Once again, voxel representations may be used for the ability to rapidly compute their EC and BN.

The OD and UD regions can be decomposed into their connected components such that "cut boundaries" are identified. The cut boundaries may be defined as the boundaries the over- and under-deposition regions share with the as-designed and as-manufactured shapes/slices, respectively. The contributions of each connected component and its cut boundary to the total topological deviation between as-designed and as-manufactured shapes/slices can be computed in terms of an additive topological property (e.g., EC) as well as possibly other properties that add up to obtain the said topological property (e.g., BN, number of cells in a cell complex, etc.). This can be done in parallel for every connected component.

The connected components can be composed into smaller components that have simpler topology (e.g., no tunnels/cavities) and their contributions to the original component characterized in terms of alternating sums. This can be done using any standard method (e.g., Reebs graphs). Components that contribute nonzero values to the global topological property(s) are identified. Topological defects caused from different combinations of the sign and values of nonzero contributions for OD and UD regions can be classified. For each type of problem, a local remedy can be prescribed—e.g., change the policy locally to eliminate the problem or give feedback (plus suggested design changes) to the designer for the local feature.

In some embodiments, the persistence of topological properties can be quantified across a range of AM parameters such as printer resolution and allowance for over-deposition. For example, persistent homology to can be used to compute a persistence barcode/diagram of the topological events that occur such as the birth/death of topological features along continuous change of the AM parameters. This process (called "filtration") identifies the parameter values at which the as-manufactured shape/slice experiences a change in its topological properties that (possibly) further deviates it from the as-designed shape/slice. The filtration parameters include, but are not limited to, the size of the MMN and allowance for over-deposition (e.g., overlap measure ratio).

The above global procedure can be performed on local regions such as the OD and UD components that individually contribute to the overall topological changes. The trade-offs between geometric accuracy and topological integrity can be visualized by plotting the global and/or local topological properties as a function of the different filtration parameters. The system 1500 also includes a user interface 1512 that can be used to both receive user inputs (e.g., varying parameters 1516 that would theoretically be input to a manufacturing instrument 1514 such as an AM instrument) and present a visualization of the effect of the user inputs on the topological changes to the as-manufactured part.

One example implementation of this method is to plot BNs as a function of MMN size and allowance for over-deposition (e.g., overlap measure ratio) for the global as-manufactured family of shapes/slices or the local OD and UD features (see, e.g., FIG. 13). This plot shows the trade-off between resolution and allowance, or viewed differently, between geometric inaccuracies tolerated by over-deposition and topological disintegration. For example, if it is possible to recover an as-designed topological characteristic (e.g., connectivity or porosity in a local region) by sacrificing geometric accuracy, this plot will show the minimum required sacrifice. Similarly, it will provide minimum resolution required to maintain topology when there are constraints on maximal allowance, and vice versa. This enables defining the minimal/maximal AM parameter values that give different levels of guarantees to limit/bound topological deviations.

For example, this could be used to inform the designer that in order to keep the change in the number of connected components (similarly for tunnels or cavities) less than or equal to a certain amount (including zero: no change allowed) what is the minimum resolution (for fixed allowance) or minimum allowance (for fixed resolution) required. More generally, it provides a Pareto frontier of trade-offs between these parameters for every required bound on the topological deviations (locally or globally). A collection of parameters may also be identified that are likely to produce computationally unreliable results due to noise and/or representation approximations (e.g., rasterization error), hence could produce unpredictable output after sending these representations to an AM instrument. The designer can be provided with feedback to avoid these combinations of parameters.

In FIG. 16, a flowchart shows a method according to an example embodiment. The method involves computing 1600 set differences between an as-designed and an as-manufactured model. One or more UD and OD features are computed 1601, e.g., by decomposing set differences between the UD and OD features into disjoint pieces. Discrepancies between the as-designed model and the as-manufactured model are determined based on the set differences, e.g., by looking at properties of the disjoint pieces. For example, local topological properties (e.g., EC, BN) of the UD and OD features can be computed and combined to obtain contributions to the global properties. The discrepancies can be quantified based on the local topological properties. Based on the discrepancies, an input to a manufacturing instrument is changed to reduce topological differences between the as-manufactured model and the as-designed model.

In FIG. 17, a flowchart shows a method according to another example embodiment. The method involves computing 1700 motions of a manufacturing instrument (e.g., an AM instrument). As-manufactured models are computed 1701 from the motions by sweeping a MMN over the geometry of an as-designed model. Fields are computed 1702 over a configuration space of the manufacturing instrument to determine overlaps of the MMN and the as-designed model (e.g., via cross-correlations or convolutions of defining functions of the MMN and the as-designed shapes). The motions of the manufacturing instrument are parameterized 1703 by thresholding overlap measure fields. The parameterized motions are used 1704 as an input to the manufacturing instrument to create a modified replica of the as-designed model.

In FIG. 18, a flowchart shows a method according to another example embodiment. The method involves computing 1800 UD and OD features based on set differences of an as-designed and an as-manufactured model. Topological persistence of the UD and OD features are computed 1801 in response to changes in process parameters of a manufacturing instrument (e.g., an AM instrument). Based on the topological persistence, geometric and topological deviations between the as-manufactured model from the as-designed model are determined 1802. An input to the manufacturing instrument is changed 1803 based on the deviations to reduce topological differences between the as-manufactured model and the as-designed model.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method, comprising:
determining a family of as-manufactured shapes based on an as-designed shape of a part, each member of the family comprising different overlap measure ratios between one and zero respectively corresponding to strict over-deposition and strict under-deposition policies of an additive manufacturing instrument;
determining under deposition (UD) regions and over deposition (OD) regions based on intersection regions between the as-designed shape and the as-manufactured shapes;
decomposing the UD regions and the OD regions into respective connected components;
computing contributions of the connected component to a total topological deviation between the as-designed shape and the as-manufactured shapes in terms of an additive topological property;
composing the connected components into smaller components;
characterizing the contributions of the smaller components to the respective connected component in terms of alternating sums of the additive topological property to identify a subset of the connected components that contribute nonzero values to a global topological property;
for each of the subset of connected components, providing localized remedies to reduce the contributions of the connected components to the global topological property; and
changing an input to the additive manufacturing instrument to include the localized remedies when building the as-manufactured shapes.

2. The method of claim 1, wherein decomposing the UD regions and the OD regions into the connected components defines cut boundaries of the connected components, the intersection regions sharing the cut boundaries with the as-designed shape and the as-manufactured shapes, and wherein the cut boundaries are used computing contributions of the connected components to the total topological deviation.

3. The method of 1, wherein determining the family of as-manufactured shapes comprises cross-correlations or convolutions of defining functions of a minimum manufacturable neighborhood (MMN) and the as-designed shape.

4. The method of claim 1, wherein determining the family of as-manufactured shapes comprises:

determining a first indicator function based on the as-designed shape;

determining a second indicator function based on a minimum manufacturable neighborhood (MMN) of the additive manufacturing instrument;

determining a cross-correlation of the first indicator function with the second indicator function, the cross-correlation providing a real-valued field corresponding to an overlap measure of the MMN with the as-designed shape; and selecting a superlevel set of the real-valued field that defines the family of as-manufactured shapes.

5. The method of claim 4, wherein the first and second indicator functions are fields in the respective underlying spaces that map every point in the underlying spaces to 0 if points are outside the underlying spaces and to 1 if the points are inside the underlying spaces.

6. The method of claim 1, wherein composing the connected components into smaller components comprises composing:

OD features that are within the as-manufactured shapes and outside the as-designed shape;

OD cut boundaries that connect the OD features to a boundary of the as-manufactured shapes;

UD features that are within the as-designed shape and outside the as-manufactured shapes; and UD cut boundaries that connect the UD features to the boundary of the as-manufactured shapes.

7. The method of claim 6, wherein the additive topological properties comprise Euler characteristics (EC) of: the OD features; the OD cut boundaries; the UD features; and the UD cut boundaries.

8. The method of claim 1, wherein the localized remedy comprises one or both of applying an OD policy to a UD feature and applying a UD policy to an OD feature, wherein the OD policy and UD policy are applied only to the vicinity of the respective UD and OD feature, and not to the entire as-manufactured shapes.

9. A system comprising a processor configured via instructions to perform the method of claim 1.

10. A method comprising:

determining a family of as-manufactured shapes based on an as-designed shape of a part, each member of the family comprising different overlap measure ratios between one and zero respectively corresponding to strict over-deposition and strict under-deposition policies of an additive manufacturing instrument;

determining localized topological discrepancies for each of the as manufactured shapes as compared to the as-designed shape, the localized topological discrepancies contributing nonzero values to a global topological property;

performing topological persistence filtering over a continuous change of process parameters of the additive manufacturing instrument;

based the topological persistence filtering, determining a combination of the process parameters that result a predefined bound on the localized topological discrepancies;

changing an input to the additive manufacturing instrument to utilize the combination of the process parameters.

11. The method of claim 10, wherein the topological persistence filtering comprises changing the size of a minimum manufacturable neighborhood of the additive manufacturing instrument for a given deposition policy.

12. The method of claim 10, wherein the topological persistence filtering comprises changing deposition policies of the additive manufacturing instrument for a given minimum manufacturable neighborhood.

13. The method of 10, wherein determining the family of as-manufactured shapes comprises cross-correlations or convolutions of defining functions of a minimum manufacturable neighborhood (MMN) and the as-designed shape.

14. The method of claim 13, wherein determining the family of as-manufactured shapes comprises:

determining a first indicator function based on the as-designed shape;

determining a second indicator function based on a minimum manufacturable neighborhood (MMN) of the additive manufacturing instrument;

determining a cross-correlation of the first indicator function with the second indicator function, the cross-correlation providing a real-valued field corresponding to an overlap measure of the MMN with the as-designed shape; and selecting a superlevel set of the real-valued field that defines the family of as-manufactured shapes.

15. The method of claim 14, wherein the first and second indicator functions are fields in the respective underlying spaces that map every point in the underlying spaces to 0 if points are outside the underlying spaces and to 1 if the points are inside the underlying spaces.

16. A system comprising a processor configured via instructions to perform the method of claim 10.

* * * * *